United States Patent
Chang

(10) Patent No.: US 6,865,302 B2
(45) Date of Patent: Mar. 8, 2005

(54) PERCEPTION-BASED IMAGE RETRIEVAL

(75) Inventor: Edward Y. Chang, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 657 days.

(21) Appl. No.: 09/805,305

(22) Filed: Mar. 12, 2001

(65) Prior Publication Data

US 2001/0046332 A1 Nov. 29, 2001

Related U.S. Application Data

(60) Provisional application No. 60/190,141, filed on Mar. 16, 2000.

(51) Int. Cl.[7] .................................................. G06K 9/60
(52) U.S. Cl. ........................ 382/305; 382/209; 382/278; 707/3; 345/968
(58) Field of Search ................................ 382/164, 171, 382/190, 209, 217, 219, 260, 278, 282, 305; 11/6; 707/3, 4; 345/968

(56) References Cited

U.S. PATENT DOCUMENTS

| | | | | |
|---|---|---|---|---|
| 5,751,286 A | | 5/1998 | Barber et al. ................ 345/348 |
| 5,806,061 A | * | 9/1998 | Chaudhuri et al. ............ 707/3 |
| 5,915,250 A | | 6/1999 | Jain et al. .................... 707/100 |
| 6,023,280 A | * | 2/2000 | Becker et al. .............. 345/440 |
| 6,124,945 A | * | 9/2000 | Ishihara et al. .............. 358/1.9 |
| 6,181,817 B1 | | 1/2001 | Zabih et al. ................. 382/170 |
| 6,192,150 B1 | | 2/2001 | Leow et al. ................. 707/100 |
| 6,279,016 B1 | * | 8/2001 | De Vorchik et al. ........ 715/526 |
| 6,535,776 B1 | * | 3/2003 | Tobin et al. ................ 700/110 |
| 6,584,221 B1 | * | 6/2003 | Moghaddam et al. ....... 382/165 |

* cited by examiner

*Primary Examiner*—Bhavesh M. Mehta
*Assistant Examiner*—Yossef Kassa
(74) *Attorney, Agent, or Firm*—Gates & Cooper LLP

(57) ABSTRACT

A content-based image retrieval (CBIR) system has a front-end that includes a pipeline of one or more dynamically-constructed filters for measuring perceptual similarities between a query image and one or more candidate images retrieved from a back-end comprised of a knowledge base accessed by an inference engine. The images include at least one color set having a set of properties including a number of pixels each having at least one color, a culture color associated with the color set, a mean and variance of the color set, a moment invariant, and a centroid. The filters analyze and compare the set of properties of the query image to the set of properties of the candidate images. Various filters are used, including: a Color Mask filter that identifies identical culture colors in the images, a Color Histogram filter that identifies a distribution of colors in the images, a Color Average filter that performs a similarity comparison on the average of the color sets of the images, a Color Variance filter that performs a similarity comparison on the variances of the color sets of the images, a Spread filter that identifies a spatial concentration of a color in the images, an Elongation filter that identifies a shape of a color in the images, and a Spatial Relationship filter that identifies a spatial relationship between the color sets in the images.

21 Claims, 10 Drawing Sheets

PERCEPTION-BASED IMAGE RETRIEVAL

CROSS-REFERENCE TO RELATED APPLICATIONS

This application claims priority under 35 U.S.C. §119(e) to U.S. Provisional Patent Application No. 60/190,141, filed Mar. 16, 2000, by Edward Y. Chang, entitled "TOWARDS PERCEPTION-BASED IMAGE RETRIEVAL," which application is incorporated by reference herein.

BACKGROUND OF THE INVENTION

1. Field of the Invention

The present invention relates to systems and methods for image retrieval and in particular to systems and methods for perception-based image retrieval.

2. Description of the Related Art (Note: This application references a number of different publications as indicated throughout the specification by reference numbers enclosed in brackets, e.g., [x]. A list of these different publications ordered according to these reference numbers can be found below in Section 7 of the Detailed Description of the Preferred Embodiment. Each of these publications is incorporated by reference herein.)

Much research has been conducted on content-based image retrieval (CBIR) in the past decade. A content-based image retrieval system returns images that are "similar" to the query image. To measure similarity, most image database systems characterize images using perceptual features (e.g., color, shape and texture) and define how similarity can be quantified using these features.

Not all attempts, however, have been made to characterize images and to quantify similarity based on the characteristics of the human visual process in the CBIR community. For instance, while most traditional systems model the human response to "brightness" as a linear function, human eyes respond to brightness in a non-linear fashion. In addition, most traditional systems treat color as a continuous spectrum of wavelength, while people give simple names to only a limited number of colors (red, green, etc). Also, most systems treat all pixels on an image equally, but human vision tends to pay less attention to the border pixels, and it distributes effort unevenly by paying closer attention to ambiguous regions. Many other discrepancies exist.

The human visual system adjusts to the environment and adapts to the visual goals [14]. For instance, a person may not be able to tell if a figure is a real person or a statue at first glance. If the person pays closer attention to the figure's surface, the person may be able to identify it as a statue or person.

Thus, an image search engine must also be adaptive to the goals of a search task. The human visual system can be thought of as being divided into two parts: the eyes (the front-end) perceive images and the brain (the back-end that is equipped with a knowledge database and an inference engine) recognizes images. The front-end collects visual data for the back-end to allow high-level processing. The back-end instructs the front-end to zoom, pan, and collect visual data with different filters. (A filter can be regarded as a particular way of perceiving an image.) The front-end responds flexibly in perceiving visual data by selecting, ordering and weighting visual filters differently. The front-end and back-end may interact many times to complete a visual task.

What are needed are improved front-end designs. Specifically, there is a need for a common "front-end" to serve different back-ends for supporting different applications.

SUMMARY OF THE INVENTION

To overcome the limitations in the prior art described above, and to overcome other limitations that will become apparent upon reading and understanding the present specification, the present invention discloses a content-based image retrieval (CBIR) system that has a front-end that includes a pipeline of one or more dynamically-constructed filters for measuring perceptual similarities between a query image and one or more candidate images retrieved from a back-end comprised of a knowledge base accessed by an inference engine. The images include at least one color set having a set of properties including a number of pixels each having at least one color, a culture color associated with the color set, a mean and variance of the color set, a moment invariant, and a centroid. The filters analyze and compare the set of properties of the query image to the set of properties of the candidate images. Various filters are used, including: a Color Mask filter that identifies identical culture colors in the images, a Color Histogram filter that identifies a distribution of colors in the images, a Color Average filter that performs a similarity comparison on the average of the color sets of the images, a Color Variance filter that performs a similarity comparison on the variances of the color sets of the images, a Spread filter that identifies a spatial concentration of a color in the images, an Elongation filter that identifies a shape of a color in the images, and a Spatial Relationship filter that identifies a spatial relationship between the color sets in the images.

BRIEF DESCRIPTION OF THE DRAWINGS

Referring now to the drawings in which like reference numbers represent corresponding parts throughout.

DETAILED DESCRIPTION OF PREFERRED EMBODIMENT

Figure 1:
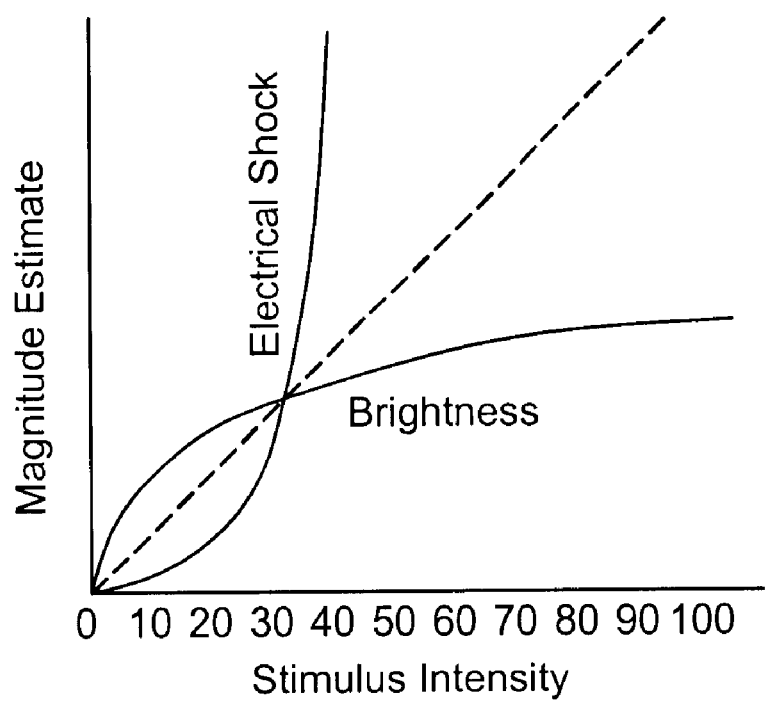
FIG. 1 illustrates Stevens's power law and shows that the magnitude of human response to brightness decreases when the stimulus intensity increases.

In the following description, reference is made to the accompanying drawings which form a part hereof, and which show, by way of illustration, a preferred embodiment of the present invention. It is understood that other embodiments may be utilized and structural changes may be made without departing from the scope of the present invention.

1 Overview

Since a content-based image retrieval (CBIR) system services people, its image characterization and similarity measure must closely follow perceptual characteristics. This specification enumerates a few psychological and physiological invariants and show how they can be considered by a CBIR system. Distance functions are proposed to measure perceptual similarity for color, shape, and spatial distribution. In addition, the specification models an image search engine after the human visual system, which adjusts to the environment and adapts to the visual goals. The present invention shows that a visual front-end can be decomposed into filters of different functions and resolutions. Moreover, a pipeline of filters can be dynamically constructed to meet the requirement of a search task and to adapt to specific search objectives.

The contributions of the present invention are as follows:

Some of perceptual invariants are enumerated and the invention shows how to apply them in image representation (Section 2).

Distance functions are proposed, e.g., Hamming, Gaussian and Triangle functions to measure similarity for color and spatial distribution of colors (Section 3).

A visual front-end is decomposed into filters and the invention shows how filters can be selected and weighted to support personalizable queries (Section 4).

2 Perceptual Characteristics

Many researchers in content-based image retrieval have assumed that the perceptual color space is an Euclidean metric space. Based on this assumption, clustering and indexing schemes that use Euclidean distance to measure similarity are employed. In addition, most studies treat all pixels equally in characterizing an image. The present invention first describes two perceptual characteristics to argue that using Euclidean distance may not be all appropriate and suggest alternatives. The present invention then shows that not all pixels in an image attract equal perceptual attention. In Section 3, these perceptual characteristics are applied to image filter design.

2.1 JND and JNS

The Just Noticeable Difference (JND) is the smallest difference between two stimuli that a person can detect. B. Goldstein [4] uses the following example to illustrate the JND: A person can detect the difference between a 100-gram weight and a 105-gram weight but cannot detect a smaller difference, so the JND for this person is 5 grams.

For the purposes of this invention, a new term is introduced. The term is Just Not the Same (JNS). Using the same weight example, it may be said that a 100-gram weight is just not the same as a weight that is more than 120-gram. So, the JNS is 20 grams. When the weight is between 105 and 120 grams, it is said that the weight is similar to a 100-gram weight (to a degree).

Now, JND and JNS can be applied to human color perception. A person can hardly tell the difference between deep sky blue (whose RGB is 0,191,255) and dodger blue (whose RGB is 30,144,255). The perceptual difference between these two colors is below JND. On the other hand, a person can tell that blue is different from green and yellow is different from red. In both cases, the colors are perceived as JNS.

For an image search engine, JND and JNS indicate that using Euclidean distance or measuring color difference may not be appropriate. First, JND reveals that when the difference exists but is small enough, then two different colors are perceived the same. Second, JNS reveals that when the difference is significant, it can be said that the two colors are not the same. Taking both JND and JNS into consideration, color similarity can thus be quantified in three discrete regions:

When the color difference is above JNS: the similarity is defined to be zero. (JNS colors are discussed below.)

When the color difference is between JND and JNS: the similarity is between zero and 100%.

When the color difference is below JND: the similarity is 100%.

2.1.1 JNS Colors

The term JNS colors is defined in what follows. Although the wavelength of visible light is 400 meters to 700 meters, research [5] shows that the colors that can be named by all cultures are limited to eleven. In addition to black and white, the discernible colors are red, yellow, green, blue, brown, purple, pink, orange and gray.

It is difficult to quantify the difference between two JNS colors. Can it be said that green is more similar to blue than to yellow? Can it be said that pink is more similar to red than brown is to red? The similarity between two JNS colors is simply defined to be zero.

2.1.2 Benefits

Quantifying color similarity in three regions provides the flexibility to design color filters of different resolutions. Color masks, color histograms, color-average and color-variance filters are described in Section 3. Picking different combination of filters can accomplish different search objectives. (Some examples are shown in Section 3).

2.2 Response Compression

The second important characteristic of human vision is a person's response to "brightness." When the intensity of a light is doubled, the light does not look twice as bright. According to S. Stevens's experiment in 1957, doubling the light intensity causes only a small change in perceived brightness. FIG. 1 illustrates Stevens's power law and shows that the magnitude of human response to brightness decreases when the stimulus intensity increases. Stevens's power law states that the perceived magnitude, P, equals a constant, K, times the stimulus intensity, S, raised to a power, n, or $$P = K \times S^n \tag{1}$$

The exponent for brightness is about 0.6.

According to Stevens's power law, the visual sensitivity is a non-linear function with respect to the intensity of the stimulus. Using this law as a starting point, colors are first transferred from RGB space to a component color space with intensity and perceived contrasts [2, 15]. The new values of a color pixel based on the RGB values of an original pixel are defined as follows:

$$\begin{cases} S = (R+G+B)/3 \\ C_2 = (R + (\max - B))/2 \\ C_3 = (R + 2*(\max - G) + B)/4 \end{cases} \tag{2}$$

Here, max is the maximum possible value for each color component in the RGB color space. For a standard 24-bit color image, max=255. The intensity is isolated in S. This color space is similar to the opponent color axes:

$$\begin{cases} RG = R - 2*G + B \\ BY = -R - G + 2*B \\ WB = R + G + B \end{cases} \tag{3}$$

defined in [1] and [13]. (Red and green, blue and yellow, and white and black are opponent color pairs.)

2.2.1 Normalizing Axes

Once S is isolated, the intensity can be characterized using the perceived magnitude, P, which can be obtained by plugging S into the right-hand side of Equation 1. The values of P, $C_2$ and $C_3$ are also normalized to be between 0 and 1. When two colors belonging to the same culture color are compared, this normalized Euclidean distance is used in P, $C_2$ and $C_3$ space to quantify their similarity.

2.2.2 Benefits

Isolating intensity from colors can achieve two benefits. First, intensity can be normalized, so that color similarity can be characterized more accurately. Second, the intensity factor can be omitted, if it is desired to remove the effect of light sources from measuring image similarity. Two filters can be designed, wherein one filter takes light sources into consideration and the other filter does not take light sources into consideration. A search task employs an appropriate filter for its goal.

2.3 Pixel Location

Figure 2:
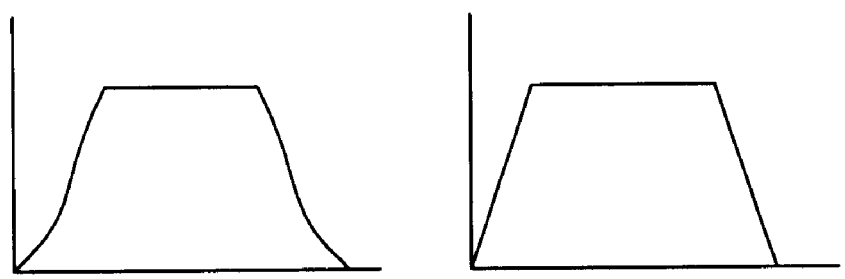
FIG. 2 shows two possible weighting functions for the pixels on the x and y axes.
Figure 3A:
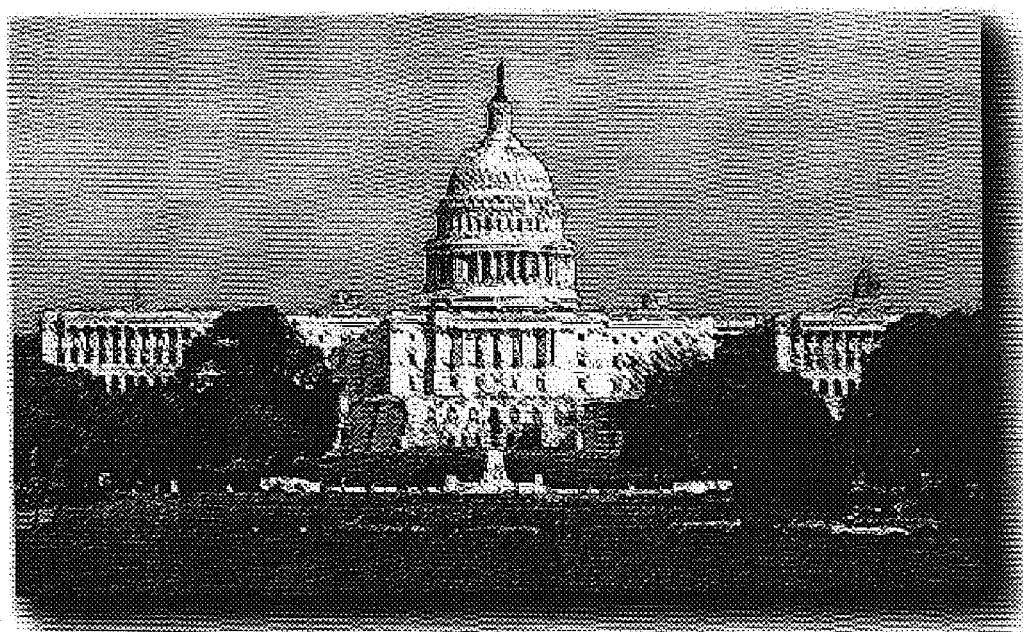
FIGS. 3A and 3B are examples of pixel weighting images.
Figure 3B:
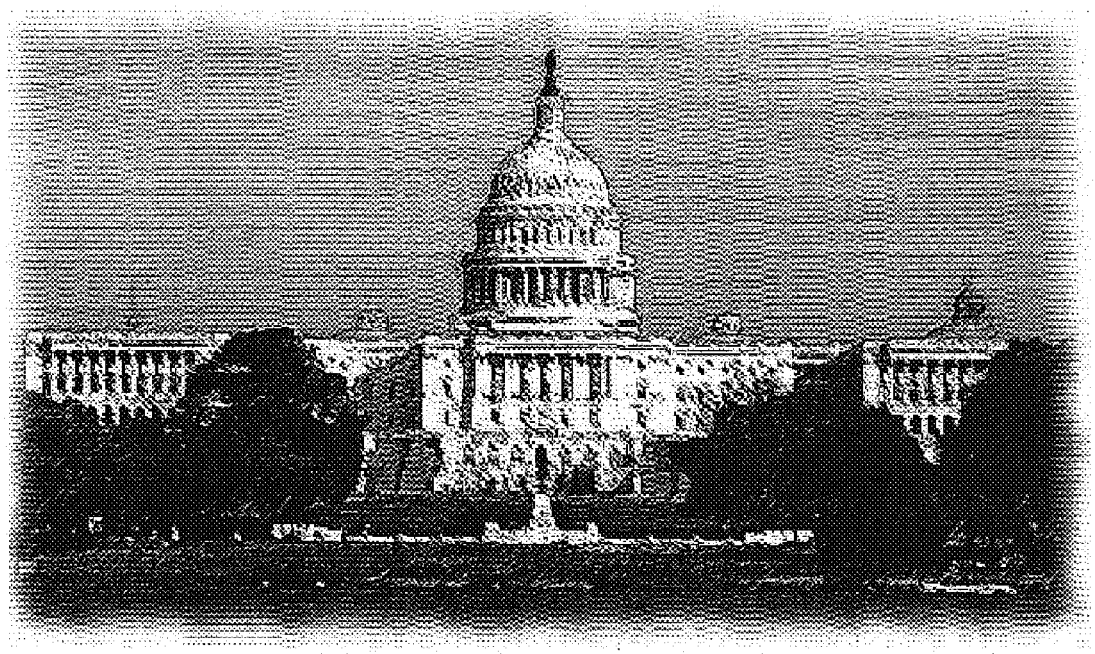

Not all pixels in an image are equally important to human perception. For instance, since people tend to look at the middle of an image, the pixels there tend to fire more neurons in the part of the brain devoted to perception than do those at the border. (The reason people tend to look at the middle of an image is that people tend to place important objects in the middle when they take a picture.) To take this factor into consideration, the pixels can be weighted based on their location. FIG. 2 shows two possible weighting functions for the pixels on the x and y axes. FIGS. 3A and 3B are examples of pixel weighting images, wherein FIG. 3A presents an image before and FIG. 3B presents an image after, the border pixels were weighted less significant. These two images provide the same visual information.

2.3.1 Benefits

Weighting pixels can remove the information that is not essential for similarity matching. For example, discounting the pixels on the image border is helpful for finding similar images that have been framed. Multi-resolution image analysis can also benefit from pixel weighting. For example, the background pixels may be weighted lighter and the foreground pixels may be weighted heavier.

2.4 Multi-Resolution Image Processing

People tend to pay closer attention to ambiguous regions in an image to acquire in more information for cognitive processing. For instance, a person may not be able to tell if a red circle is an apple at first glance. If closer attention is paid to the circle's surface, the person may be able to identify it. As discussed in Section 1, image semantics are derived at the visual back-end, where a knowledge database and inference engine make intelligent processing on the collected visual data. When an object in an image is ambiguous, the back-end may instruct the front-end to look at the area more closely or it may look at the surrounding areas (i.e., the object context) to infer the unknown object. For example, to identify if a car is a toy or a real one, the back-end may attempt to find what the car is on (e.g., on a road or on a table), and then make an "intelligent guess."

The present invention focuses on the front-end. The front-end must be able to respond to the back-end's request to provide needed visual data, e.g., to zoom in on an object or to pan to the left and right of an object. Human vision can thus be thought of as a mechanism having filters of different functions and resolutions. The visual back-end instructs the visual front-end to dynamically compose a visual pipeline of selected filters for a particular cognitive purpose. In Section 3, filters are discussed in detail.

3 Image Filters

There could be thousands of useful image filters. To illustrate the concept of composing filters for a visual task, a few color-based image filters are enumerated in this section. The perceptual characteristics described in Section 2 are considered in the filter design. Shape and texture are treated as attributes of a color set. (One can build filters by treating color and texture as attributes of a segmented shape or color and shape as attributes of a texture [10, 11].) It is shown in Section 4 that selecting different filters can support queries that have different objectives.

To characterize an image, it is divided into color sets. A color set is the collection of pixels in an image that have the same color. Here, the visible color space is divided into eleven JNS colors (discussed in Section 2.1). An image thus consists of at most eleven color sets, where a color set is characterized by three attributes of the image: its color, moments and centroid. These attributes are defined as follows:

Color: The culture color of the pixel collection. Each culture color spans a range of wavelengths. The mean and variance of the color set are kept on the three axes, P, $C_2$ and $C_3$. The number of pixels belonging to the color set are also recorded.

Moments: The moment invariants [6] of the color set. Moment variants are properties of connected regions in binary images that are invariant to translation, rotation and scaling.

Centroid: The center of gravity of the color set, $\hat{x}$ and $\hat{y}$.

Next, a description how these attributes can be used to build image filters and how each filter measures similarity is provided.

3.1 Color Masks

Each image has an 11-bit color mask, and each bit represents a culture color. If a culture color is present, the corresponding bit in the mask is set. To filter out noise, it is said that a color is present only if it covers at least α percent (e.g., one percent) of the pixels.

To compare two color masks (of two different images), the Hamming distance is employed. The Hamming distance of two color masks is the number of colors by which the two masks differ. For instance, the Hamming distance between {black, red, blue} and {green, red, blue} is two. Let $H_{A,B}$ denote the Hamming distance between color masks $M_A$ and $M_B$, or $H_{A,B} = M_A \oplus M_B$.

The color masks plus the percentage of pixels each present color covers form a color histogram. To compare the difference between two color histograms, traditional measures proposed by [3, 12] can be employed.

3.2 Refined Color Matcher

Suppose two color sets belong to the same JNS color (e.g., blue). A refined comparison step is performed to see how similar are the colors (e.g., navy blue and sky blue). Traditionally, the similarity measure of two colors is done by comparing the Euclidean distance between their P, $C_2$ and $C_3$ (or HVS, etc.) averages. (This is known as a color-average filter.)

It is believed that employing color variance in the similarity measure adds the texture dimension to the consideration. For instance, the color of a building is typically uniformly distributed along the $C_2$ and $C_3$ axes. (The value of P may vary due to the lighting condition.) A JNS color on a natural image is usually perceptually non-uniform. For instance, a green pasture may have green of different saturation and intensity.

To measure similarity based on the mean and variance of a culture color, the Gaussian functions represented by two sets of the mean and the variance in $C_2$ and $C_3$ are compared. Similarity is defined as the intersecting area of the two Gaussian functions. Given two normalized Gaussian functions $f_1(x)$ and $f_2(x)$ and their means ($\bar{x}_1$ and $\bar{x}_2$) and variances ($\sigma_1$ and $\sigma_2$), the statistics community has shown that the following characteristic distance can be used to depict the difference between $f_1(x)$ and $f_2(x)$ [8]:

$$\Psi = \frac{|\bar{x}_1 - \bar{x}_2|}{\sqrt{\sigma_1 \sigma_2}}$$

Notice that the larger the variances, the harder it is to distinguish one Gaussian from the other.

3.3 Pixel Masks

A pixel mask weights the pixels on an image by their location. The term $w_{ij}$ is used to denote the weight of the pixel at the i, j coordinate. The value of $w_{ij}$ is between zero and one.

3.4 Spatial Relationship: Triangle Filter

For some image applications, capturing the spatial relationship between the dominant objects can be helpful. A sunset picture, for example, can be roughly depicted as an orange circle above a dark horizon. A firework show can be characterized as sparks of colors on a black background. A tree should be beneath a blue or gray sky and above the land.

The present invention proposes using a triangle to capture the spatial relationship between the major pixel sets on an image. A triangle is used for two reasons. First, any geometrical shape can be composed of triangles. Second, the similarity of two triangles immunes from many geometrical transformations such as translation, rotation and scaling.

Figure 4:
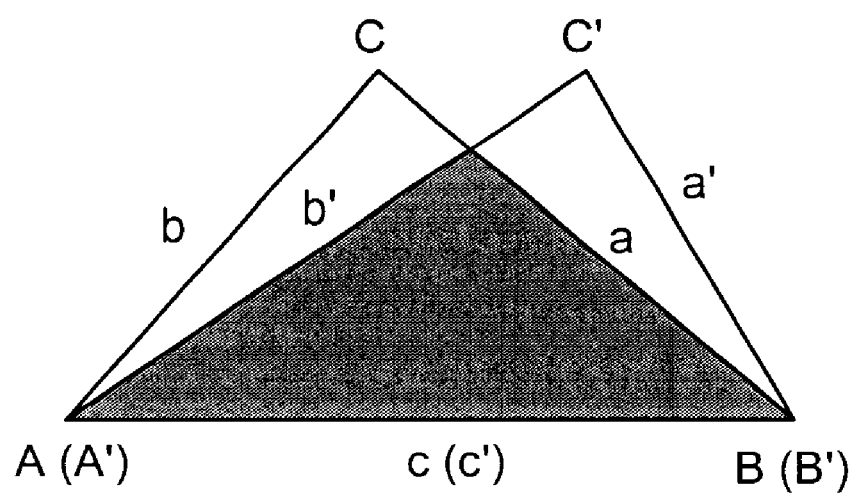
FIG. 4 illustrates triangle similarity.

To compare the similarity of two feature triangles, their three nodes are first compared. If the search is color-based, two triangles must have three matching color nodes. If the search is shape-based, two triangles must have three nodes of the same shapes (i.e., spread, elongation, etc.). After the triangles pass this first screening step, the similarity of two triangles is defined as:

$$V = \frac{S_o}{S_a}$$

where $S_o$ is the intersected area of two triangles (the shaded area in FIG. 4, which illustrates triangle similarity) and $S_a$ denotes the average area of two triangles.

3.5 Shapes

Moment invariants [6] are properties of connected regions in binary images that are invariant to translation, rotation and scaling. They are useful because they define a simply calculated set of properties that can be used for shape classification and part recognition inside a region. The $(p, q)^{th}$ central moment of a color set $c_k$ can be defined as:

$$\mu p, q = \sum_{i=1}^{M} \sum_{j=1}^{N} f_{ck}(i, j)(x_{i,j} - \hat{x})^p (y_{i,j} - \hat{y})^q \qquad (4)$$

where $\hat{x}$ is the average x position, $\hat{y}$ is the average y position, and $f_{ck}(i,j)=1$ if the pixel color at the (i,j) location is $c_k$.

Basic shapes can be identified by examining the first moment of a pixel collection. For example, experimental results confirm that the first moment of a circle, regardless of its size and location on the image, is a constant. In addition, several high-level shape characteristics can be derived from low-level moments. The study of [7] defines "spreadness" (which is known as spread) as a normalized average distance of pixels to the center of the shape. It shows how much the shape is spread. Another important index is elongation, which reflects how much the shape is elongated. The details of spread and elongation are described in Section 8.

3.6 Filter Summary

Table 1 below summarizes the filters discussed in this section. The filters are roughly divided into coarse and fine resolution ones. A coarse filter may be used at some occasions and fine filters may be used at other occasions. For instance, if it is desired to search wall-papers of a given pattern, using color asks of different Hamming distance can be a good choice.

Again, segmentation, texture analysis and other techniques can be employed to design filters of finer resolutions. The present invention focuses on showing that combining filters of different functions and resolutions, and considering perceptual characteristics in filter design make a search engine flexible in adapting search tasks that have different objectives.

TABLE 1

Filter Summary

| Filter Name | Representation |
|---|---|
| Color Masks | Number of identical JNS colors |
| Color Histogram | Distribution of colors |
| Color Average | Similarity comparison within the same JNS color |
| Color Variance | Similarity comparison within the same JNS color |
| Spread | Spatial concentration of a color |
| Elongation | Shape of a color |
| Spatial Relationship | Spatial relationship between major color sets |

4 Exemplary Implementation

Figure 5:
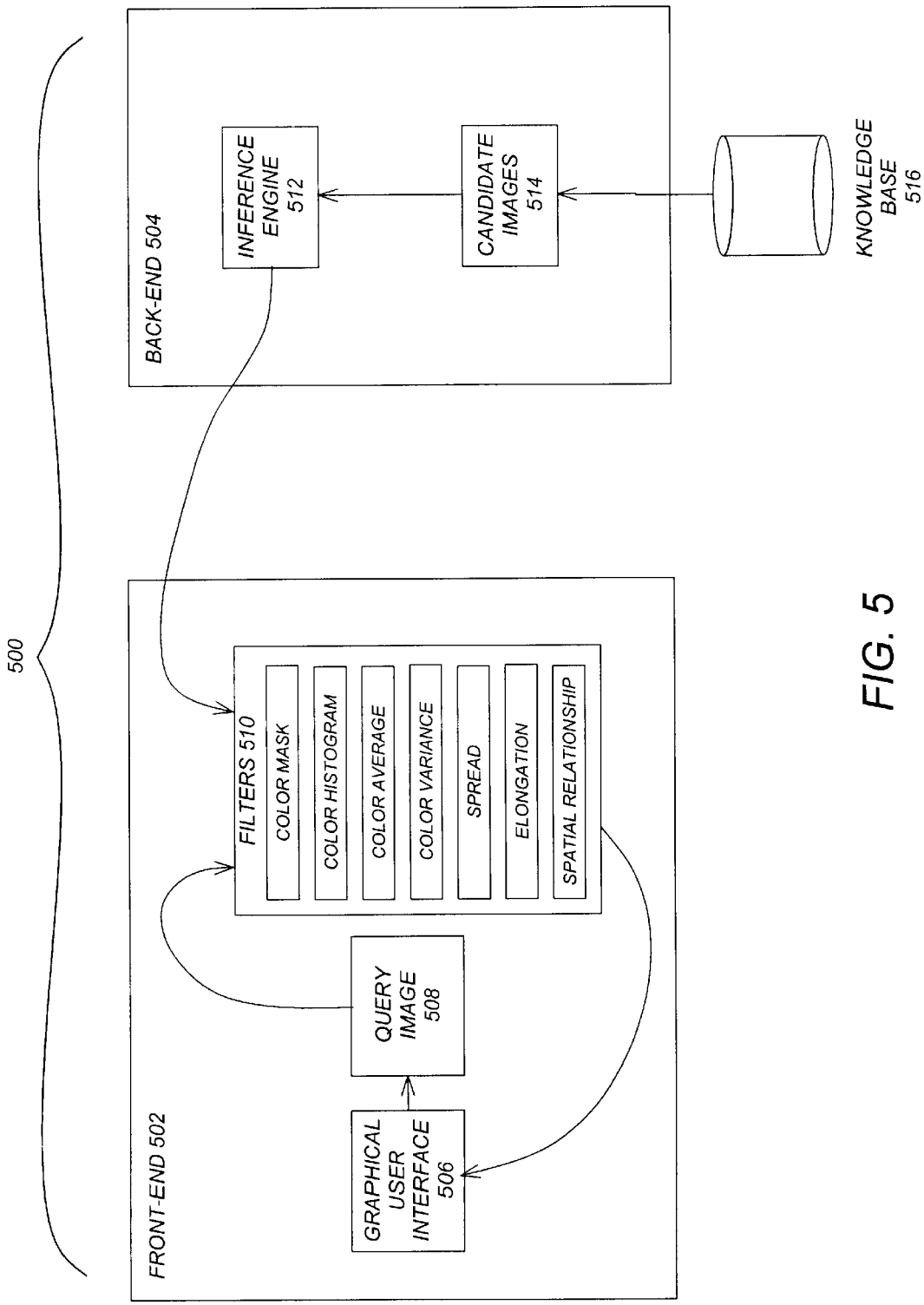
FIG. 5 illustrates an exemplary implementation of the present invention.

FIG. 5 illustrates an exemplary implementation of the present invention. Generally, the present invention comprises logic and/or data that may be implemented as a method, apparatus, or article of manufacture. For example, the present invention may be implemented in a computer system, in an electronic device, etc. Those skilled in the art will recognize that any number of different components, including different logic, different data, and different devices, may be used to implement the present invention, so long as similar functions are performed thereby.

In the embodiment illustrated in FIG. 5, the implementation is an electronic content-based image retrieval (CBIR) system 500 that includes a front-end 502 that communicates with a back-end 504, wherein the front-end 502 includes a graphical user interface 506, a query image 508 and a pipeline of one or more dynamically-constructed filters 510 (such as those described in Table 1 above), and the back-end 504 includes an inference engine 512, one or more candidate images 514, and a knowledge base 516. The graphical user interface 506 interacts with a user to identify and/or accept the query image 508, that is then used for comparison, by means of one or more the filters 510, against one or more candidate images 514 retrieved by the inference engine 512 from the knowledge base 516.

Preferably, the filters 510 measure perceptual similarities of colors, shapes, and spatial distributions between the query image 508 and one or more of the candidate images 514 retrieved from the knowledge base 516 by the inference engine 512. The images 508 and 514 include at least one color set having a set of properties including a number of pixels each having at least one color, a culture color associated with the color set, a mean and variance of the color set, a moment invariant, and a centroid. The filters 510 analyze and compare the set of properties of the query image 508 to the set of properties of the candidate images 514, according to the following: (1) the Color Mask filter identifies identical culture colors in the images 508 and 514, (2) the Color Histogram filter identifies a distribution of colors in the images 508 and 514, (3) the Color Average filter that performs a similarity comparison on the average of the color sets of the images 508 and 514, (4) the Color Variance filter performs a similarity comparison on the variances of the color sets of the images 508 and 514, (5) the Spread filter identifies a spatial concentration of a color in the images 508 and 514, (6) the Elongation filter identifies a shape of a color in the images 508 and 514, and (7) the Spatial Relationship filter identifies a spatial relationship between the color sets in the images 508 and 514. These various filters can be selected and weighted to support personalizable queries.

6 Experimental Results

In the implementation described above, filters can be combined in to obtain the desired results for a target application. For example, for one image copy detector that has been built for the Web (RIME [2]), color masks, color histograms, color-variance, shape and triangle filters are employed. This combination matches not only the major colors between images, but also shapes and the spatial relationship between colors. In addition, using a pixel mask that discounts the pixels on the image border, query processing is able to find replicas that have been framed.

To achieve personalizable queries, the query processing of the present invention should be adaptive to user preferences and relevance feedback. When a user expresses that some returned results are not satisfactory, the query processing should learn from the feedback and then add, remove or replace filters to achieve better results. To rank the return images, the linear model described in [9] is used to combine filter scores.

In the remainder of this section, four query examples of progressive refinement are shown. Experiments were conducted on a collection of 500,000 randomly crawled Web images.

Figure 6A:
FIGS. 6A and 6B illustrate the experimental results from queries that look for shots of the same scene.

FIG. 6A illustrates the experimental results from queries that look for shots of the same scene. (The query image is on the left-hand side of each row of the figure and the top five similar images are presented as the remaining elements of the row.) The first three rows show the search results of three different search pipelines. The first row used color histograms only (with eleven JNS colors). The search returned images that are quite different from the query image, but that have the similar color composition. The pipeline was refined by adding a filter that compares the average values of P, $C_2$ and $C_3$, in each JNS color bin (i.e., average-color filter). The improved result is shown in the second row. Finally, the average-color filter was replaced with the refined color matcher described in Section 3.2. The experiments were able to obtain one additional matching image.

Figure 6B:
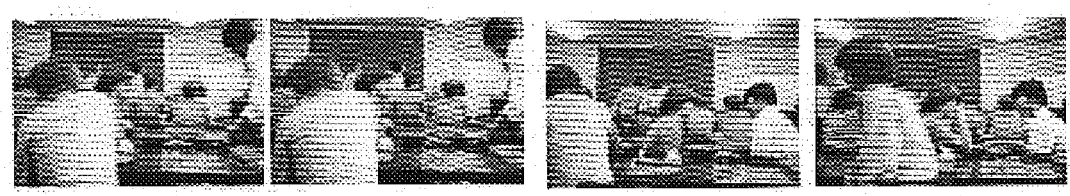

The same experiment was repeated on a classroom photo shown in FIG. 6B. The row in this figure shows that the result is satisfactory.

Figure 7:
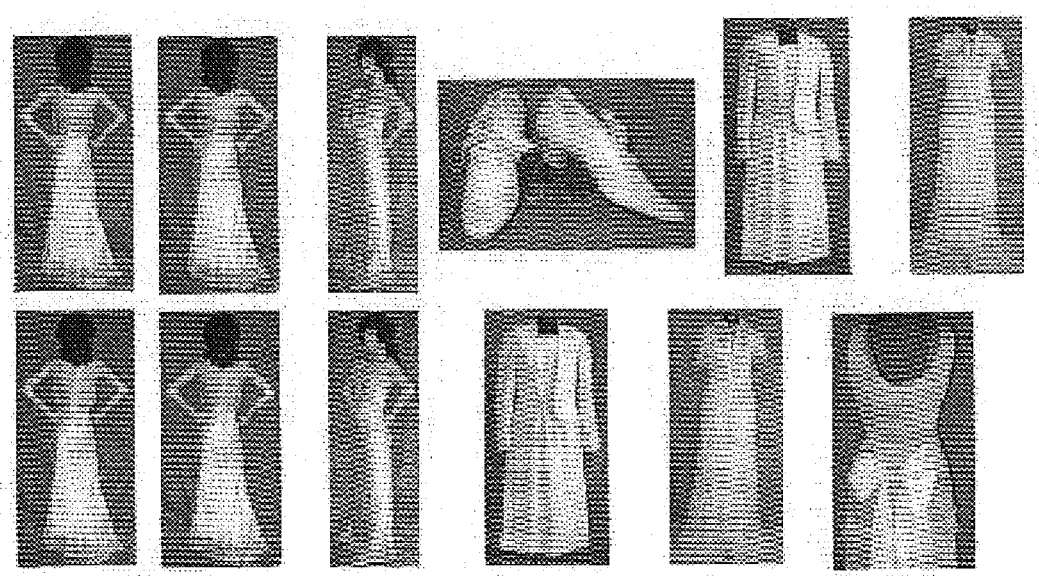
FIG. 7 illustrates the experimental results from queries on a dress.

FIG. 7 illustrates the experimental results from queries on a dress. First, color histograms and color average were used as the filters. The result presented in the first row also returns a pair of shoes. Apparently, the shape of the dress is different from that of the shoes. Shape filters were thus added to the pipeline and the result in the second row eliminates the shoes. (If it is desired to search for shoes that can go with the dress, the first pipeline is the desired one.)

Figure 8:
FIG. 8 illustrates the experimental results from queries on a grayscale image.

FIG. 8 illustrates the experimental results from queries on a grayscale image. Since grayscale images have at most three JNS colors (black, gray and white), the filters based on just colors cannot differentiate images well. In fact, using color histograms, color-average and color-variance filters returned many dissimilar images. To improve the result, the shape filters and the spatial relationship filter (i.e., the triangle filter) were added. FIG. 8 shows the returned images all have ship-like object on ocean-like background.

6 Conclusions

The present invention enumerates four perceptual characteristics and shows how to model and quantify them. The present invention also shows that the human visual system perceives images by combining filters of different functions and resolutions. By decomposing the human visual system into filters, a high-level pipeline of filters can be dynamically constructed to perform a specific visual task, e.g., categorizing an image or identifying an object in an image. By considering a user's relevance feedback, this technique of dynamic visual pipeline construction can support a customizable/personalizable image search engine that can be tailored to meet the goal of a particular visual task. The present invention can be extended in the area of perception-based image characterization, and to formalize the principles and mechanisms for constructing a visual pipeline and for measuring its cost and performance (e.g., recall and precision).

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

7 References

The following references are all incorporated by reference herein:

[1] D. H. Ballard and C. M. Brown. Computer vision. Prentice-Hall, 1982.

[2] E. Chang, J. Wang, C. Li, and G. Wiederhold. RIME—a replicated image detector for the world-wide web. Proc. of SPIE Symposium of Voice, Video, and Data Communications, November 1998.

[3] M. Flickner, H. Sawhney, W. Niblack, J. Ashley, Q. Huang. Query by image and video content: the QBIC system. IEEE Computer, 28(9):23–32, 1995.

[4] E. Goldstein and S. Fink. Selective attention in vision. Journal of Experimental Psychology, 7, 1981.

[5] E. B. Goldstein. Sensation and Perception (5th Edition). Brooks/Cole, 1999.

[6] L. M. Hurvich and D. Jameson. An opponent-process theory of color vision. Psychological Review, 64:384–90, 1957.

[7] J. G. Len, Computing a shape's moments from its boundary. Pattern Recognition, Vol. 24, No. 10, pp. 949–957, 1991.

[8] C. Li. Introduction to experimental statistics. McGraw-Hill Book Company, pages 403–413, 1964.

[9] C. S. Li, Y. C. Chang, L. Bergman, and J. R. Smith. Model-based in multi-modal information retrieval from large archives. ICDCS (to appear), 2000.

[10] B. S. Manjunath and W. Y. Ma. Texture features for browsing and retrieval of image data. IEEE Transactions on Pattern Analysis and Machine Intelligence, 18(8):837–842, August 1996.

[11] R. W. Picard. A society of models for video and image libraries. IBM System Journal, 35(3 & 4):292–312, 1996.

[12] Y. Rubner, C. Tomasi, and L. Guibas. Adaptive color-image embedding for database navigation. Proceedings of the Asian Conference on Computer Vision, January 1998.

[13] M. Swain and D. H. Ballard. Color indexing. Int. Journal of Computer Vision, 7(1):11–32, 1991.

[14] B. Wandell. Foundations of Vision. Sinauer, 1995.

[15] J. Z. Wang, G. Wiederhold, 0. Firschein, and S. X. Wei. Content-based image indexing and searching using daubechies' wavelets. International Journal of Digital Libraries, 1(4):311–28, 1998.

8 Spread and Elongation

Several high-level shape characteristics can be derived from low-level moments. The minimum inertia, $I_{min}$, is the inertia when the shape rotates about its major axis:

$$I_{min} = \frac{\mu_{20} + \mu_{02} - \sqrt{4\mu_{11}^2 + (\mu_{20} - \mu_{02})^2}}{2}$$

The maximum inertia, $I_{max}$, is the inertia when the shape rotates about its minor axis:

$$I_{max} = \frac{\mu_{20} + \mu_{02} + \sqrt{4\mu_{11}^2 + (\mu_{20} - \mu_{02})^2}}{2}$$

Based on $I_{max}$ and $I_{min}$, the study of [7] defines "spreadness" (also known as spread) as follows:

$$S = \frac{I_{min} + I_{max}}{\mu_{00}^2} = \frac{\sum_n r^2}{n^2}$$

In the equation, r is the distance from the pixel to the center of the shape. Spread is thus a normalized average distance of pixels to the center of the shape. It shows how much the shape is spread.

Another important index is elongation, which reflects how much the shape is elongated. Elongation, denoted as E, can be expressed as:

$$E = \frac{I_{max} - I_{min}}{I_{max} + I_{min}}.$$

Figure 9:
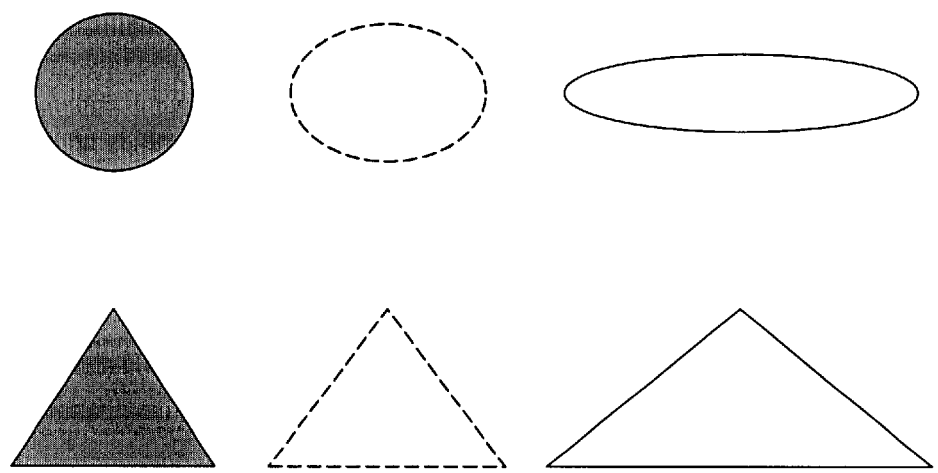
FIG. 9 illustrates elongation.

Every shape has a major axis and a minor axis. For example, the major axis and minor axis for a circle is an arbitrary line passing through the center of the circle, so $I_{max}$ and $I_{min}$. But, for an ellipse, the major axis is the long axis, and the minor axis is the short axis. When the ellipse is elongated, the $I_{max}$, becomes larger while the $I_{min}$ remains constant, so the elongation will move toward 1 as the ellipse is elongated. The same principle applies for other shapes. The elongation of the circle at the left-hand side of FIG. 9 is zero. The elongation of the ellipse in the middle of FIG. 9 and at the right-hand side of FIG. 9 is 0.537 and 0.959, respectively. The elongation of the three triangles in the figure also increase from the left to the right.

What is claimed is:

1. An electronic content-based image retrieval (CBIR) system, comprising a front-end including a pipeline of one or more dynamically-constructed filters for measuring perceptual similarities between a query image and one or more candidate images retrieved from a back-end comprised of a knowledge base accessed by an inference engine, wherein relevance feedback is used to add, remove or replace filters to achieve better results.

2. The system of claim 1, wherein the images include at least one color set having a set of properties including a number of pixels each having at least one color, a culture color associated with the color set, a mean and variance of the color set, a moment invariant, and a centroid.

3. The system of claim 2, wherein the filters analyze and compare the set of properties of the query image to the set of properties of the candidate images.

4. The system of claim 2, wherein the filters are selected from a group comprising:
    a Color Mask filter that identifies identical culture colors in the images,
    a Color Histogram filter that identifies a distribution of colors in the images,
    a Color Average filter that performs a similarity comparison on the average of the color sets of the images,
    a Color Variance filter that performs a similarity comparison on the variances of the color sets of the images,
    a Spread filter that identifies a spatial concentration of a color in the images,
    an Elongation filter that identifies a shape of a color in the images, and
    a Spatial Relationship filter that identifies a spatial relationship between the color sets in the images.

5. The system of claim 1, wherein one or more of the filters are selected and weighted to support personalizable queries.

6. The system of claim 1, wherein one or more of the filters include distance functions to measure the perceptual similarities of colors, shapes, and spatial distributions in the images.

7. The system of claim 6, wherein the distance functions are selected from a group comprising Hamming, Gaussian and Triangle functions.

8. A method for query processing in an electronic content-based image retrieval (CBIR) system, comprising
    retrieving one or more candidate images from a back-end comprised of a knowledge base accessed by an inference engine; and
    measuring perceptual similarities between a query image and the candidate images using a pipeline of one or more dynamically-constructed filters in a front-end, wherein relevance feedback is used to add, remove or replace filters to achieve better results.

9. The method of claim 8, wherein the images include at least one color set having a set of properties including a number of pixels each having at least one color, a culture color associated with the color set, a mean and variance of the color set, a moment invariant, and a centroid.

10. The method of claim 9, wherein the filters analyze and compare the set of properties of the query image to the set of properties of the candidate images.

11. The method of claim 9, wherein the filters are selected from a group comprising:
    a Color Mask filter that identifies identical culture colors in the images,
    a Color Histogram filter that identifies a distribution of colors in the images,
    a Color Average filter that performs a similarity comparison on the average of the color sets of the images,
    a Color Variance filter that performs a similarity comparison on the variances of the color sets of the images,
    a Spread filter that identifies a spatial concentration of a color in the images,
    an Elongation filter that identifies a shape of a color in the images, and
    a Spatial Relationship filter that identifies a spatial relationship between the color sets in the images.

12. The method of claim 8, wherein one or more of the filters are selected and weighted to support personalizable queries.

13. The method of claim 8, wherein one or more of the filters include distance functions to measure the perceptual similarities of colors, shapes, and spatial distributions in the images.

14. The method of claim 13, wherein the distance functions are selected from a group comprising Hamming, Gaussian and Triangle functions.

15. An article of manufacture embodying logic for query processing in an electronic content-based image retrieval (CBIR) system, comprising retrieving one or more candidate images from a back-end comprised of a knowledge base accessed by an inference engine; and measuring perceptual similarities between a query image and the candidate images using a pipeline of one or more dynamically-constructed filters in a front-end, wherein relevance feedback is used to add, remove or replace filters to achieve better results.

16. The article of manufacture of claim 15, wherein the images include at least one color set having a set of properties including a number of pixels each having at least one color, a culture color associated with the color set, a mean and variance of the color set, a moment invariant, and a centroid.

17. The article of manufacture of claim 16, wherein the filters analyze and compare the set of properties of the query image to the set of properties of the candidate images.

18. The article of manufacture of claim 16, wherein the filters are selected from a group comprising:

a Color Mask filter that identifies identical culture colors in the images, a Color Histogram filter that identifies a distribution of colors in the images, a Color Average filter that performs a similarity comparison on the average of the color sets of the images, a Color Variance filter that performs a similarity comparison on the variances of the color sets of the images, a Spread filter that identifies a spatial concentration of a color in the images, an Elongation filter that identifies a shape of a color in the images, and a Spatial Relationship filter that identifies a spatial relationship between the color sets in the images.

19. The article of manufacture of claim 15, wherein one or more of the filters are selected and weighted to support personalizable queries.

20. The article of manufacture of claim 15, wherein one or more of the filters include distance functions to measure the perceptual similarities of colors, shapes, and spatial distributions in the images.

21. The article of manufacture of claim 20, wherein the distance functions are selected from a group comprising Hamming, Gaussian and Triangle functions.

* * * * *